United States Patent
Hartley et al.

(10) Patent No.: US 6,827,873 B2
(45) Date of Patent: *Dec. 7, 2004

(54) DEICING SOLUTION

(75) Inventors: Robert A. Hartley, Ontario (CA); David H. Wood, Rome, NY (US)

(73) Assignee: Sears Petroleum & Transport Corp., Rome, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/444,559

(22) Filed: May 23, 2003

(65) Prior Publication Data

US 2003/0205693 A1 Nov. 6, 2003

Related U.S. Application Data

(63) Continuation of application No. 10/260,808, filed on Sep. 30, 2002, now Pat. No. 6,582,622, which is a continuation-in-part of application No. 10/212,319, filed on Aug. 5, 2002, now Pat. No. 6,596,188, and a continuation-in-part of application No. 10/212,318, filed on Aug. 5, 2002, now Pat. No. 6,599,440, which is a continuation-in-part of application No. 09/971,163, filed on Oct. 4, 2001, now Pat. No. 6,440,325, and a continuation-in-part of application No. 09/971,165, filed on Oct. 4, 2001, now Pat. No. 6,436,310, which is a continuation-in-part of application No. 09/755,587, filed on Jan. 5, 2001, now Pat. No. 6,299,793, which is a continuation-in-part of application No. 09/224,906, filed on Jan. 4, 1999, now abandoned.

(60) Provisional application No. 60/070,636, filed on Jan. 7, 1998.

(51) Int. Cl.$^7$ ................................................ C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 4,668,416 A | 5/1987 | Neal | 252/70 |
| 4,676,918 A | 6/1987 | Toth et al. | 252/70 |
| 4,746,449 A | 5/1988 | Peel | 252/70 |
| 4,842,588 A | 6/1989 | Jones | 252/70 |
| 5,135,674 A | 8/1992 | Kuhajek et al. | 252/70 |
| 5,635,101 A | 6/1997 | Janke et al. | 252/70 |
| 5,639,319 A | 6/1997 | Daly | 152/450 |
| 5,709,813 A | 1/1998 | Janke et al. | 252/70 |
| 5,772,912 A | 6/1998 | Lockyer et al. | 252/70 |
| 5,922,240 A | 7/1999 | Johnson et al. | 252/70 |
| 5,932,135 A | 8/1999 | Janke et al. | 252/70 |
| 6,080,330 A | 6/2000 | Bloomer | 252/70 |
| 6,149,834 A | 11/2000 | Gall et al. | 252/70 |
| 6,299,793 B1 | 10/2001 | Hartley et al. | 252/70 |
| 6,398,979 B2 | 6/2002 | Koefod et al. | 252/70 |
| 6,416,684 B1 | 7/2002 | Bloomer | 252/70 |
| 6,436,310 B1 | 8/2002 | Hartley et al. | 252/70 |
| 6,440,325 B1 | 8/2002 | Hartley et al. | 252/70 |
| 6,468,442 B2 | 10/2002 | Bytnar | 252/70 |
| 6,582,622 B1 * | 6/2003 | Hartley et al. | 252/70 |
| 6,596,188 B1 * | 7/2003 | Hartley et al. | 252/70 |
| 6,599,440 B2 * | 7/2003 | Hartley et al. | 252/70 |

FOREIGN PATENT DOCUMENTS

| | | |
|---|---|---|
| RU | 1664808 | 7/1991 |
| WO | 01/07532 A1 | 2/2001 |

OTHER PUBLICATIONS

CRC Handbook of Chemistry and Physics, A Ready–Reference Book of Chemical and Physical Data, David R. Lide, 78th Edition 1997–1998, pp. 8–56, 8–61, 8–62, 8–64, 8–73, 8–74. (no month).

Composition of Corn Steep Water during Steeping, Steven R. Hull, Byung Yun Yang, David Venzke, Kurt Kulhavy and Rex Montgomery, J. Agic. Food Chem. 1996, 44, 1857–1863. (no month).

Brewers Condensed Solubles. I. Composition and Physical Properties, B.R. Sebree, D.S. Chung and P.A. Seib, vol. 60, No. 2, 1983, pp. 147–151. (no month).

Determination of the Carbohydrate Components of the Low Molecular Weight Fraction and Fraction E., Report No. 99–B21E–0050 (Interim No. 8) 4 pages, 2 Appendices, Dated Aug. 30, 1999.

Low–D.E. Corn Starch Hydrolysates, Multi–functional carbohydrates aid in food formulation, Reprinted from Food Technology, vol. 27, No. 3, pp. 38–40, Copyright 1972 by Institute of Food Technologists, Daniel G. Murray and Leslie R. Luft. (no month).

Slip–sliding away, Southbridge Evening News, Southbridge, MA, Feb. 16, 1998, Bruce Uptom.

Public Works Engineering, Construction & Maintenance, Jul. 1997.

T.W. Graham Solomons and Craig B. Fryhle, Organic Chemistry 7th edition, pp. 1124–1125 (no date).

* cited by examiner

*Primary Examiner*—Anthony J. Green
(74) *Attorney, Agent, or Firm*—Wall Marjama & Bilinski LLP

(57) ABSTRACT

A de-icing and anti-icing composition in the form of an aqueous solution which includes sugars, and an inorganic freezing point depressant in the form of a chloride salt.

10 Claims, No Drawings

DEICING SOLUTION

CROSS REFERENCE TO RELATED APPLICATIONS

This is a continuation of U.S. Ser. No.: 10/260,808 filed Sep. 30, 2002 now U.S. Pat. No. 6,582,622, (Granted Jun. 24, 2003), which is a continuation-in-part of U.S. Ser. No.: 10/212,319, now U.S. Pat. No. 6,596,188, filed Aug. 5, 2002 (Granted Jul. 22, 2003), and a continuation-in-part of U.S. Ser. No.: 10/212,318, now U.S. Pat. No. 6,599,440, filed Aug. 5, 2002 (Granted Jul. 29, 2003), which both are a continuation-in-part of application U.S. Ser. No. 09/971,163 now U.S. Pat. No. 6,440,325 and U.S. Ser. No. 09/971,165 now U.S. Pat. No. 6,436,310 both filed on Oct. 4, 2001 (Granted Aug. 27, 2002 and Aug. 20, 2002, respectively), which are both a continuation-in-part of U.S. Ser. No. 09/755,587, now U.S. Pat. No. 6,299,793, filed Jan. 5, 2001 (Granted Oct. 9, 2001), which is a continuation-in-part application of U.S. Ser. No. 09/224,906 filed on Jan. 4, 1999, now abandoned and U.S. Ser. No.: 60/070,636 filed Jan. 7, 1998, the entirety of each of the above applications which are incorporated herein by reference.

BACKGROUND OF THE INVENTION

The current state of the art for coping with snow and ice on roads usually involves applying a deicer material such as a salt to the road surface. Sometimes antiskid materials such as sand or other aggregates such as gravel are added with or without a salt.

The use of salt and compositions having high concentrations of salt, cause an undesirable corrosive effect on vehicles, the road surface, and the environment with respect to the run off of water containing salt which contaminates the surrounding land and water.

Considering the above problems associated with salt formulations, there has been a continuing need for a deicing composition or formulation which can effectively melt snow and ice yet which reduces the corrosion and environmental contamination referred to above. In response to the above problems associated with the use of road salt, the prior art has looked to alternative formulations which are less corrosive and more environmentally friendly.

U.S. Pat. No. 5,635,101 (Janke et al.) relates to a deicing composition containing a by-product of a wet milling process of shelled corn. Corn kernels are steeped or soaked in a hot solution containing small amounts of sulfurous acid. The corn kernels are separated from the steep water and steep water solubles are used in the production of a deicing composition.

U.S. Pat. No. 4,676,918 (Toth et al.) relates to a deicing composition which comprises a mixture containing at least one component selected from a number of chlorides or urea and an admixture of waste concentrate of alcohol distilling that has a dry substance content of from 200 to 750 g/kg and from 10% to 80% by weight of water.

U.S. Pat. No. 6,080,330 (Bloomer) teaches a composition for use in preventing the formation of ice or snow on outdoor surfaces, such as roadways or aggregate stockpiles, and also for deicing surfaces upon which snow or ice has formed. The composition is formed from a waste product of the process of removing sugar from sugar beet molasses, also known as desugared sugar beet molasses.

The Janke et al., Toth et al. and Bloomer materials are naturally occurring substances with hundreds (if not thousands) of components such as complex carbo-hydrates, starches, sugars, proteins etc. and are normally used with a salt.

The above de-icing solutions now being introduced in the field employ agricultural residues e.g., corn based distillers solubles and solubles from the corn wet milling industries. These naturally occurring substances, which also include brewers condensed solubles, are extremely variable in composition, viscosity, film forming tendency, freezing temperature, pH etc., and consequently give varying performance when used in de-icing solutions. Depending upon the source and batch, these materials at low temperatures sometimes exhibit such resistance to flow that they cannot be applied evenly to a road surface or mixed with a chloride, rendering them virtually unsuitable for use.

Furthermore, these patents utilize materials which have highly undesirable or unnecessary ingredients leading to practical difficulties by manufacturers and users, such as stratification in storage, biological degradation, odor, plugging of filters and spray nozzles and environmental difficulties e.g. high biological oxygen demand due to the very high organic contents (about 40% by weight), presence of phosphorus compounds and heavy metals.

To improve quality and performance, and to meet current mandated standards, there is an immediate need for synthetic, chemically modified thickeners, and carefully purified materials which can be substituted for the currently used agricultural residues. Such a formulation would improve performance and reduce metal corrosion, spalling of concrete, toxicity and addresses environmental concerns.

It is therefore an object of the present invention to provide a deicing formulation which exhibits improved performance standards which overcomes the prior art problems described above.

It is a further object of the present invention to provide a deicing formulation which utilizes a synergistic combination of a low molecular weight carbohydrate and an inorganic freezing point depressant.

It is another object of the present invention to provide a deicing formulation which utilizes a low molecular weight carbohydrate to provide for improved ice melting properties and exhibits less corrosion.

It is a further object of the present invention to provide a deicing formulation which provides consistent physical and chemical properties, thereby assuring consistent quality and performance.

It is another object of the present invention to provide an economical, highly effective deicing formulation.

SUMMARY OF THE INVENTION

The present invention is based upon the discovery that low molecular weight (about 180 to 1,000) carbohydrates when used with an inorganic freezing point depressant such as a chloride salt has a synergistic effect upon freezing point depression. The formulation of deicing/anti-icing compositions employs carbohydrates of less than about 1,000 molecular weight, such as glucose/fructose, disaccharides, trisaccharides, tetrasaccharides, pentasaccharides, hexasaccharides, and mixtures thereof. The broader operative range for the carbohydrate molecular weight is from about 180 to 1,500, with the range of about 180 to 1,000 being preferred.

The basic composition of the present invention consists of at least the first two of the following three components in aqueous solution depending upon ambient weather conditions, terrain, nature and amount of freezing/snow precipitation, and environmental concerns:

(1) Inorganic freezing point depressants preferably in the form of chloride salts which include magnesium chloride, calcium chloride and sodium chloride. Metal acetates e.g. calcium magnesium acetate, and other suitable acetates may also be used. (2) Low molecular weight carbohydrates in the 180 to 1,500 range (180–1, 000 preferred). These carbohydrates can be obtained from a wide range of agricultural based products such as those derived from corn, wheat, barley, oats, sugar cane, sugar beets etc.

(3) Thickeners are used in certain applications as the third key component to increase the viscosity of the composition so that the liquid remains in contact with the road surface or with the solid particles in piles of rocksalt/sand, or rocksalt/aggregates, or salt alone, or sand or aggregate. Thickeners are mainly cellulose derivatives or high molecular weight carbohydrates. Typical molecular weights for cellulose derivatives are for methyl and hydroxy propyl methyl celluloses from about 60,000 to 120,000 and for hydroxy ethyl celluloses from about 750,000 to 1,000,000. Carbohydrate molecular weights range from about 10,000 to 50,000.

These components are used in an aqueous solution in the following concentrations:

|  | Weight % |
| --- | --- |
| Carbohydrate | 3 to 60 |
| Inorganic Freezing Point Depressant | 5 to 35 |
| Thickener | 0.15 to 10 |

In a further embodiment of the present invention it has been found that certain low molecular weight sugars function as highly effective carbohydrates in the above formulations.

The above described compositions provide a de-icing and anti-icing formulation which can be formulated more uniformly to provide for more consistent properties from batch to batch, while at the same time providing for increased ice melting properties.

DETAILED DESCRIPTION OF THE INVENTION

In the development of the present invention it was determined that the predominant organic constituents in the prior art formulations described above were carbohydrates, and in one series of tests, Brewers Condensed Solubles (BCS), which was selected as a test sample, was diluted with water and separated into several fractions by the addition of increasing amounts of an ethanol/methanol 85/15 v/v mix. The characteristic of the various fractions and their freezing points when mixed with 15% magnesium chloride are tabulated below.

TABLE 1

| Sample | % ethanol/ methanol added | % Solids | % Carbohydrates | Freezing Point ° F. | ° C. |
| --- | --- | --- | --- | --- | --- |
| Brewers (BCS) | NIL | 43.6 | 43.1 | −31.9 | −35.5 |
| Fraction A Precipitate | 60 | 5.3 | 3.8 | −10.1 | −23.4 |
| Fraction B Precipitate | 74 | 3.7 | 3.2 | −10.8 | −23.8 |

TABLE 1-continued

| Sample | % ethanol/ methanol added | % Solids | % Carbohydrates | Freezing Point ° F. | ° C. |
| --- | --- | --- | --- | --- | --- |
| Fraction C Precipitate | 82 | 2.8 | 2.1 | −10.3 | −23.5 |
| Fraction D Precipitate | 85 | 1.3 | 0.6 | −9.9 | −23.3 |
| Fraction E Solubles | 85 | 30.7 | 29.8 | −22.7 | −30.4 |

Fraction A consisted of essentially insoluble, high molecular weight polysaccharides, whereas Fractions B to D inclusive gave gummy residues of polysaccharides. Fractions A to D had little effect upon freezing point depression. Fraction E, the largest component, had a considerable effect upon freezing point and is a mixture of lower molecular weight polysaccharides.

Fraction E was also examined for ice melting characteristics at 25° F. (−4° C.) in admixture with magnesium chloride employing SHRP H-205.2 Test Method for Ice Melting of Liquid Deicing Chemicals.

TABLE 2

| Deicing Solution | Lbs weight ice melted per lb weight of inorganic salt |
| --- | --- |
| 15% magnesium chloride, control | 16.9 |
| Brewers BCS/Mg Cl$_2$ | 18.2 |
| Fraction E/Mg Cl$_2$ | 19.3 |
| 32% calcium chloride | 7.3 |
| 26.3% sodium chloride | 7.5 |

The last two figures were calculated from data in SHRP H-205.2. These results indicate the appreciable improvement over the commonly used sodium and calcium chlorides in ice melting characteristics when Fraction E and Brewers BCS are mixed with magnesium chloride. There is also a 14% improvement over the control when Fraction E is used. This, together with freezing point depression improvement indicates that an appreciably improved deicing solution can be formulated.

The next stage of the investigation consisted of attempting to isolate and define the active components in the Brewers BCS. This was done by first filtering employing a 0.45 micron membrane followed by ultrafiltration using a Model UFP-1-E-s (A/G Technology Corporation, Needham, Mass.) with a nominal cutoff at a molecular weight of 1000 and finally gel permeation chromatography (GPC) using a Waters LC Module 1 unit with a set of three ultrahydrogel columns and 50 mm Na$_2$ HPO$_4$ solution at pH 7 as the mobile phase. The brewers BCS liquor had two major carbohydrate fractions (a) a low molecular weight fraction with the majority of components having a molecular weight of less than 1000, and (b) a high molecular weight fraction containing compounds with a molecular weight of 12,600 but with some components in the 1000 to 10,000 molecular weight range. Fraction E was found to have a chromatographic profile very similar to the low molecular weight fraction (a) above with a molecular weight of less than 1000. Cane Sugar DCS liquor had more components than the Brewers BCS but had similar high and low molecular weight fractions with similar molecular weight distributions.

In order to confirm that the low molecular weight fraction has the greatest effect upon freezing point depression, a further series of freezing points were measured using in this instance, Dead Sea Salt Solution from Jordan in lieu of laboratory grade magnesium chloride. Again the concentration of magnesium chloride was 15% by weight for all samples.

TABLE 3

| Sample | Freezing Point | |
|---|---|---|
| | °F. | °C. |
| Control: Industrial grade magnesium chloride solution/Water | −0.4 | −18.0 |
| Brewers (BCS) | −31.9 | −35.5 |
| Brewers GPC High Mol Wt Fraction | −5.1 | −20.6 |
| Brewers GPC Low Mol Wt Fraction | −16.4 | −26.9 |
| Brewers BCS Fraction E | −13.4 | −25.2 |

It was thus shown that low molecular weight (less than 1000) carbohydrates had the greatest effect upon freezing point depression. Based upon these experiments, it was concluded that the formulation of deicing/anti-icing compositions should employ compounds in the less than 1000 molecular weight range such as those tabulated below in Table 4:

TABLE 4

| Carbohydrate | Molecular Weight |
|---|---|
| Glucose/fructose | 180 |
| Disaccharides | 342 |
| Trisaccharides | 504 |
| Tetrasaccharides | 666 |
| Pentasaccharides | 828 |
| Hexasaccharides | 990 |

There is available commercially a wide range of carbohydrates with varying carbohydrate compositions. An evaluation was conducted using simple sugars, disaccharides and polysaccharides in an attempt to determine the effect of molecular weight and solute concentration upon freezing point. The concentration of magnesium chloride used in the test was 15% by weight. The test results for simple carbohydrates and complex carbohydrates are tabulated below in Tables 5 and 6 respectively.

TABLE 5

SIMPLE CARBOHYDRATES

| Carbohydrate | | % Concentration of Carbohydrate | Freezing Point | |
|---|---|---|---|---|
| Type | Name | | °F. | °C. |
| Control | Mg Cl$_2$ (15%) | Nil | −4.7 | −20.4 |
| Sugar | Fructose | 25.0 | −8.9 | −22.7 |
| Sugar | Fructose | 50.0 | −18.2 | −27.9 |
| Sugar | Fructose | 75.0 | −31.9 | −35.5 |
| Sugar | Glucose | 30.0 | −11.4 | −24.1 |
| Sugar | Glucose | 65.0 | −37.3 | −38.5 |
| Disaccharide | Maltose | 25.0 | −8.3 | −22.4 |
| Disaccharide | Lactose | 25.0 | −11.7 | −24.3 |

TABLE 6

COMPLEX CARBOHYDRATES

| Carbohydrate | % Concentration of Carbohydrate | Freezing Point | | Comments |
|---|---|---|---|---|
| | | °F. | °C. | |
| Control Mg Cl$_2$ (15%) | Nil | −4.7 | −20.4 | |
| Corn syrup-high maltose | 30 | −5.6 | −20.9 | Contains glucose, maltose and maltotrisoe |
| Corn syrup-high maltose | 65 | −19.1 | −28.4 | |
| Corn syrup solids DE20 | 25.0 | −9.9 | −23.3 | Average Mol. Wt. 3746 |
| Corn syrup solids DE44 | 25.0 | −11.6 | −24.2 | Average Mol. Wt. 1120 |
| Corn syrup solids DE44 | 50.0 | −21.3 | −29.6 | |
| Corn syrup solids DE44 | 65.0 | −27.0 | −32.8 | |

It can be seen from the results above that glucose is better than fructose and of the two dissaccharides lactose is somewhat better than maltose. The corn syrup DE20 has about 47% of mono to hexasaccharides and the DE44 grade has about 69%, and the latter grade is slightly better in reducing freezing point. Also Table 6 shows that there is a relationship between carbohydrate concentration and freezing point thus allowing various formulations to be developed.

More complex carbohydrates were also evaluated such as dextrins and maltodextrins which are derived by hydrolysis (enzymatic or via dilute mineral acids) of corn starch. In addition a series of thickeners were evaluated. The control magnesium chloride solution was prepared from the hexahydrate in Table 7 below which shows the results obtained. Again all samples contained 15% by weight of magnesium chloride.

TABLE 7

| Compound | % Concentration | Freezing Point | | Comment |
|---|---|---|---|---|
| | | °F. | °C. | |
| Control 15% Mg Cl$_2$ | Nil | +3.4 | −15.9 | |
| Dextrin | 5.0 | −4.7 | −20.4 | |
| Maltodextrin DE5 | 5.0 | −4.7 | −20.4 | |
| Maltodextrin DE15 | 9.1 | −17.1 | −27.3 | Lower Mol. Wt than DE 5 |
| Hydroxyethyl cellulose 250 HHR | 0.33 | +1.2 | −17.1 | Thickener |
| Carboxymethyl cellulose | 1.0 | +2.5 | −16.4 | Thickener |
| Gum arabic | 3.6 | −1.8 | −18.8 | Thickener |
| Gum tragacanth 470 | 0.2 | −3.3 | −19.6 | Thickener |

The Maltodextrin DE15 exhibits good results due to the lower molecular weight components present and the higher concentration. The higher the molecular weight, the less the influence upon freezing point. Some thickeners were unstable in the presence of magnesium chloride e.g. carboxy methyl cellulose, and so lose their efficacy as thickeners.

It is also important to define the chloride salt content for deicing/anti-icing liquids, the higher the chloride salt content, the lower the freezing point and the higher the ice melting characteristics. These characteristics are shown by the data in Table 8 below for Mg Cl$_2$ and Ca Cl$_2$ at varying salt and carbohydrate concentrations.

TABLE 8

| Chloride Salt | % salt by weight | % Carbohydrate by weight | Freezing Point °F. | Freezing Point °C. |
|---|---|---|---|---|
| Mg Cl$_2$ | 22.7 | 18.0 | Less than −47 | Less than −43.9 |
| Mg Cl$_2$ | 15.0 | 25.5 | −22 | −30 |
| Ca Cl$_2$ | 29.6 | 18.6 | Less than −47 | Less than −43.9 |
| Ca Cl$_2$ | 17.5 | 4.1 | −5.4 | −20.8 |
| Ca Cl$_2$ | 15.0 | 4.1 | −0.6 | −18.1 |

As the concentrations of salts and carbohydrates increase the freezing point of the mixtures decrease. In the case of calcium chloride at a fixed carbohydrate concentration of 4.1% an increase of 2.5% by weight of Ca Cl$_2$ decreased the freezing point by 4.8° F. (2.67° C.). Again formulations can be varied to suit local conditions. Care must be taken as salt concentrations approach the eutectic point on the freezing point—concentration curve where the freezing point can rise and the salt can crystallize out.

From the above discussion and laboratory evaluations the basic composition consists of at least the first two of the following components in aqueous solution depending upon ambient weather conditions, terrain, nature and amount of freezing/snow precipitation, environmental concerns, etc:

(1) An inorganic freezing point depressant in the form of inorganic electrolytes, mainly chlorides, but also others, such as sulfates and acetates, and could be used in concentrations of about 5 to 35 wt %. The main types employed are magnesium chloride, calcium chloride and sodium chloride.

(2) A carbohydrate, especially lower molecular weight carbohydrates in a range of about 180 to 1500. A preferred range is about 180 to 1,000. The carbohydrates can be obtained primarily from a wide range of agricultural based products such as those derived from corn, wheat, barley, oats, sugar cane, sugar beet, etc.

(3) Thickeners which are used in a concentration of about 0.15 to 10 wt % to increase the viscosity of the compositions so that the liquid remains in contact with the road surface or with the solid particles in piles of rock salt/sand, or rock salt/aggregates, or rock salt alone, or sand or aggregate. Thickeners are mainly cellulose derivatives such as methyl cellulose, hydroxy ethyl cellulose, hydroxy propyl methyl cellulose, hydroxy propyl cellulose, etc. or high molecular weight carbohydrates.

The corrosivity of deicing/anti-icing liquids is important due to the effect upon automobiles, other road transport vehicles, bridges, reinforcing rods (rebars) in concrete structures such as bridge decks, ramps and parking garage decks.

The testing of liquids for corrosivity can be quite complex and there are a number of tests developed by organizations such as ASTM and the National Association of Corrosion Engineers (NACE). The test conditions and metals must approximate those experienced in practice such as aerobic conditions and cold rolled steel specimens. Prior art tests using nails immersed in liquid contained in a screw top bottle are not meaningful mainly because of the anaerobic conditions and the variation in metal substrate composition, the degree of cold working and cleanliness.

Satisfactory test methods include SHRP H205.7 Test Method for Evaluation of Corrosive Effects of Deicing Chemicals or Metals (Handbook of Test Methods for Evaluating Chemical deicers SHRP-H332, Strategic Highway Research Program, National Research Council, Washington, D.C.) And the test described in the Deicer Specifications for the Pacific Northwest States of Idaho, Montana, Oregon, Washington. The latter is based upon the NACE Standard test Method for the Laboratory Corrosion Testing of Metals. TM0169-95.

Some corrosion rate results employing SHRP H205.7 showing corrosion inhibition due to carbohydrate presence are tabulated below in Table 9.

TABLE 9

| % Chloride Salt | % Carbohydrate | Corrosion Rate (mils per year) | | |
|---|---|---|---|---|
| | | One Week | Three weeks | Six weeks |
| 15% Na Cl | Nil | 5.97 | 4.66 | 5.48 |
| 15% Mg Cl$_2$ | Nil | 2.58 | 1.93 | 1.73 |
| 15% Mg Cl$_2$ | 4.1 | 0.89 | 0.61 | 0.40 |

As can be seen from the data in Table 9, the carbohydrate magnesium chloride formulation reduces the corrosion rate of steel by 92.7% as compared to sodium chloride alone and 76.9% as compared to magnesium chloride alone. Formulations as shown in Examples III and IV (q.v.) were tested for corrosivity employing the Pacific Northwest States protocol and there was a reduction in the corrosion rate compared to sodium chloride solution of 57.2% for Example III and 40.4% for Example IV. This again shows corrosion inhibition properties.

The following examples are exemplary of various specific embodiments of the present invention which are useful as deicing agents:

EXAMPLE I

| Component | Part by Weight |
|---|---|
| Corn Syrup Solid DE 44 | 22.5 |
| Industrial grade magnesium chloride solution* | 50.0 |
| 2% Methocel Solution | 2.0 |
| Colorant (Caramel YT25) | 0.5 |
| Water | 25.0 |
| Freezing Point (ASTM-D 1177-94) | −12.5° F./−24.7° C. |
| Viscosity at 77°: | 20 centipoise |
| Appearance: | Gold color, clear solution |
| Odor: | Mild, pleasant |

*Note:
Industrial grade magnesium chloride solution is a commercially available magnesium chloride solution also containing calcium chloride, sodium chloride, potassium chloride.

EXAMPLE II

| Component | Parts by Weight |
|---|---|
| High maltose corn syrup | 31.5 |
| Industrial grade magnesium chloride solution | 50.0 |
| Colorant (Caramel YT25) | 0.5 |
| Water | 18.0 |
| Freezing Point (ASTM-D 1177-94): | −22° F./−30° C. |
| Viscosity at 77° F. | 14.4 centipoises |

-continued

| Component | Parts by Weight |
|---|---|
| Appearance | Gold color, clear solution |
| Odor | Mild, pleasant |

EXAMPLE III

| Components | Parts by Weight |
|---|---|
| High Maltose Corn Syrup | 22.2 |
| Industrial grade magnesium chloride solution | 70.0 |
| Water | 7.8 |
| Freezing point (ASTM-D 1177-94) | Less than −47° F./−43.9° C. |
| Appearance | Clear, light brown, mobile liquid |
| Odor | Mild, pleasant |
| Specific gravity | 1.27 |
| Viscosity at −94° F./−70° C. | Heavy syrup, flows |

EXAMPLE IV

| Component | Parts by Weight |
|---|---|
| High Maltose Corn Syrup | 20.5 |
| 43% $CaCl_2$ | 72.3 |
| Water | 7.2 |
| Freezing Point (ASTM- D 1177-94) | Less than −47° F./−43.9° C. |
| Appearance | Clear, colorless, mobile liquid |
| Odor | Mild, pleasant |
| Specific Gravity | 1.33 |
| Viscosity at −47° F./−43.9° C. | Very heavy syrup |

EXAMPLE V

| Component | Parts by Weight |
|---|---|
| High Fructose Corn Syrup | 19.55 |
| 43% Calcium Chloride Solution | 73.15 |
| Water | 7.30 |
| Freezing Point (ASTM- D 1177-94) | −31° F./−35° C. |
| Appearance | Clear, colorless, mobile liquid |
| Specific Gravity | 1.38 |
| Odor | Mild, pleasant |

EXAMPLE VI

| Component | Parts by Weight |
|---|---|
| Glucose | 32.5 |
| Industrial grade magnesium chloride solution | 50.0 |
| 2% Methoeel Solution | 2.0 |
| Colorant (Caramel YT25) | 0.5 |
| Water | 15.0 |
| Freezing Point (ASTM- D 1177-94) | −38.2° F./−39.0° C. |
| Appearance | Gold color, clear solution |
| Odor | Mild, pleasant |

Colorants may also be used to enable applicators to see where the deicer has been deposited. Non-toxic colorants which may be used include caramel solutions and food grade dyes.

In a further embodiment of the present invention it is desirable to use sugars in combination with a chloride salt. For purposes of this invention sugars include mono- to decasaccharides which have molecular weights from 180 to 1638. Sugars within this molecular weight range have a synergistic effect upon freezing point depression. Beyond this molecular weight of about 1638 the synergistic effect rapidly decreases.

Note that for substantially the same concentration of $MgCl_2$ that the three formulation using sugars exhibited a lower freezing point than $MgCl_2$ alone.

TABLE 10

| | Concentration | Mg Chloride % by Weight | Viscosity Ford Cup No. 4 (Sec.) | Freezing Point ° C. | ° F. |
|---|---|---|---|---|---|
| Maltodextrin No. 5 | 5.04 | 15.0 | 13 | −20.4 | −4.7 |
| Molasses | 18.8 | 14.9 | 13 | −24.9 | −12.8 |
| Maltodextrin No. 15 | 9.1 | 15.0 | 11 | −27.3 | −17.1 |
| Aqueous Magnesium Chloride Reference Solution | None | 15.0 | — | −15.9 | +3.4 |

Mixed sugar solutions are obtained commerically by the hydrolysis of starches and other polysaccharides obtained from corn, wheat, rice etc. A wide range of products are available which are defined by the Dextrose Equivalent Value (DE Value) and the saccharides distribution in the hydrodyzate solution. The Dextrose Equivalent is a measure of the amount of simple sugars i.e. mono- and disaccharides, and typified by glucose, fructose, maltose, sucrose and lactose. Pure glucose has a DE Value of 100. The saccharides distribution uses "DP" as a shorthand term for the varous saccharides e.g. DP1 is for monosaccharides, DP2 for disaccharides and so on.

The Maltodextrin No. 5 is a hydrolyzed product having a DE 5 value and has the following saccharide distribution i.e. mixture of sugars:

TABLE 11

| | Saccharide | % by Weight | Molecular Weight |
|---|---|---|---|
| Mono- | DP1 | 0.9 | 180 |
| Di- | DP2 | 0.9 | 342 |
| Tri- | DP3 | 1.0 | 504 |
| Tetra- | DP4 | 1.1 | 666 |
| Penta- | DP5 | 1.3 | 828 |
| Hexa- | DP6 | 1.4 | 990 |
| Hepta- | DP7 | 1.5 | 1152 |
| Octa- | DP8 | 1.4 | 1314 |
| Nona- | DP9 | 1.4 | 1476 |
| Deca- | DP10 | 1.3 | 1638 |
| Undeca- | DP11+ | 87.8 | — |

The grade of molasses listed in the Table is Molasses No 677 available from International Molasses Corporation Ltd., of New Jersey and has the following analysis:

| | |
|---|---|
| Fructose | 7 to 11% by weight |
| Glucose | 7 to 11% by weight |
| Sucrose | 30 to 36% by weight |
| Total sugars | 45 to 52% by weight |
| Ash i.e. inorganic (phosphates, Ca, K, Mg, Na) | 11.5% maximum |
| Cellulosics, high mol wt. compounds | 16 to 23% by weight |
| Total Solids | 79 to 80% |
| Water | 20 to 21% |

The molecular weight of the carbohydrate for the molasses used is between 180 and 342. The weight average molecular weight for molasses is between about 280 and 290 depending upon the saccharide mixture composition.

The Maltodextrin No. 15 is a hydrolyzed corn starch product having a DE (Dextrose Equivalent) of 15 having the following saccharide distribution i.e. mixtures of sugars.

TABLE 12

| | Saccharide | % by Weight | Molecular Weight |
|---|---|---|---|
| Mono- | DP1 | 1.3 | 180 |
| Di- | DP2 | 4.1 | 342 |
| Tri- | DP3 | 6.0 | 504 |
| Tetra- | DP4 | 4.6 | 666 |
| Penta- | DP5 | 5.2 | 828 |
| Hexa- | DP6 | 7.6 | 990 |
| Hepta- | DP7 | 6.3 | 1152 |
| Octa- | DP8 | 4.4 | 1314 |
| Nona- | DP9 | 3.5 | 1476 |
| Deca- | DP10 | 3.0 | 1638 |
| Undeca- | DP11+ | 54.0 | — |

As the hydrolysis of the polysaccharide solution is allowed to proceed the DE Value increases as does the low molecular weight sugars:

TABLE 13

| | | % Concentration By Weight | | | |
|---|---|---|---|---|---|
| DE Value | Product | DP1 | DP2 | DP3 | Greater Than DP4 |
| 5 | Maltodextrin No 5 | 0.9 | 0.9 | 1.0 | 97.2 |
| 15 | Maltodextrin No. 15 | 1.3 | 4.1 | 6.0 | 88.6 |
| 25 | Cleardex 25 AE/42 | 5.0 | 6.0 | 11.0 | 78.0 |
| 36 | Cleardex 36/43 | 14.0 | 11.0 | 10.0 | 65.0 |
| 43 | Cleardex 43/43 | 19.0 | 14.0 | 12.0 | 55.0 |
| 52 | Cleardex 52/43 | 28.0 | 18.0 | 13.0 | 41.0 |
| 60 | Cleardex 60/44 IX | 31.0 | 36.0 | 10.0 | 23.0 |
| 66 | Cleardex 66/43 | 40.0 | 35.0 | 8.0 | 17.0 |
| 97 | Cleardex 95/37 | 95.0 | 3.0 | 0.5 | 1.5 |

Here Cleardex is a trademark of the Cargill Foods Corporation.

The low DE Value materials give higher viscosity solutions than the high DE Value solutions whereeas the latter have a greater synergistic effect on freezing point depression. Combining these effects allows appreciable flexibility in formulating deicing and anti-icing compositions.

While the present invention has been particularly shown and described herein with reference to various preferred modes it will be understood by one skilled in the art that various changes in detail may be effected therein without departing from the spirit and scope of the invention as defined by the claims.

We claim:

1. A method for reducing the buildup of snow and ice on an outdoor surface, comprising:

applying to the outdoor surface a composition comprising:

an aqueous solution which contains mixtures of sugars and a chloride salt in which the constituents are present in the following concentration:

| | Weight % |
|---|---|
| Sugars | 3 to 60 |
| Chloride Salt | 5 to 35 |
| Water | Balance | and wherein the molecular weight of the sugar is in the range of about 180–1638.

2. The method of claim 1 in which the chloride salt is at least one selected from the group consisting of sodium chloride, magnesium chloride and calcium chloride.

3. The method of claim 1 which further includes a colorant to provide visual aid in applying the composition to a surface.

4. The method of claim 1 in which the molecular weight of each of the sugars is in the range of about 180 to 1638.

5. The method of claim 1 in which the composition has a viscosity of about 0.1 to 3 poises at 250° C.

6. A method for reducing the buildup of snow and ice on an outdoor surface, comprising:

applying to the outdoor surface a composition comprising:

an aqueous solution which contains mixtures of sugars, a chloride salt and a thickener in which the constituents are present in the following concentration:

|  | Weight % |
| --- | --- |
| Sugars | 3 to 60 |
| Chloride Salt | 5 to 35 |
| Thickener | 0.15 to 10 |
| Water | Balance | and wherein the molecular weight of the sugar is in the range of about 180–1638.

7. The method of claim 6 in which the chloride salt is at least one selected from the group consisting of sodium chloride, magnesium chloride and calcium chloride.

8. The method of claim 6 which further includes a colorant to provide visual aid in applying the composition to a surface.

9. The method of claim 6 in which the molecular weight of each of the sugars is in the range of about 180 to 1638.

10. The method of claim 6 in which the composition has a viscosity of about 0.1 to 3 poises at 25° C.

* * * * *

UNITED STATES PATENT AND TRADEMARK OFFICE
CERTIFICATE OF CORRECTION

PATENT NO.     : 6,827,873 B2
DATED          : December 7, 2004
INVENTOR(S)    : Robert A. Hartley and David H. Wood It is certified that error appears in the above-identified patent and that said Letters Patent is hereby corrected as shown below:

Column 12,
Line 60, the degrees "250ºC" please replace with -- 25ºC --.

Signed and Sealed this

Nineteenth Day of April, 2005

JON W. DUDAS
*Director of the United States Patent and Trademark Office*